A. STEARNS.
SICKLE APPARATUS.
APPLICATION FILED JUNE 4, 1912.
1,112,231.
Patented Sept. 29, 1914.
2 SHEETS—SHEET 1.
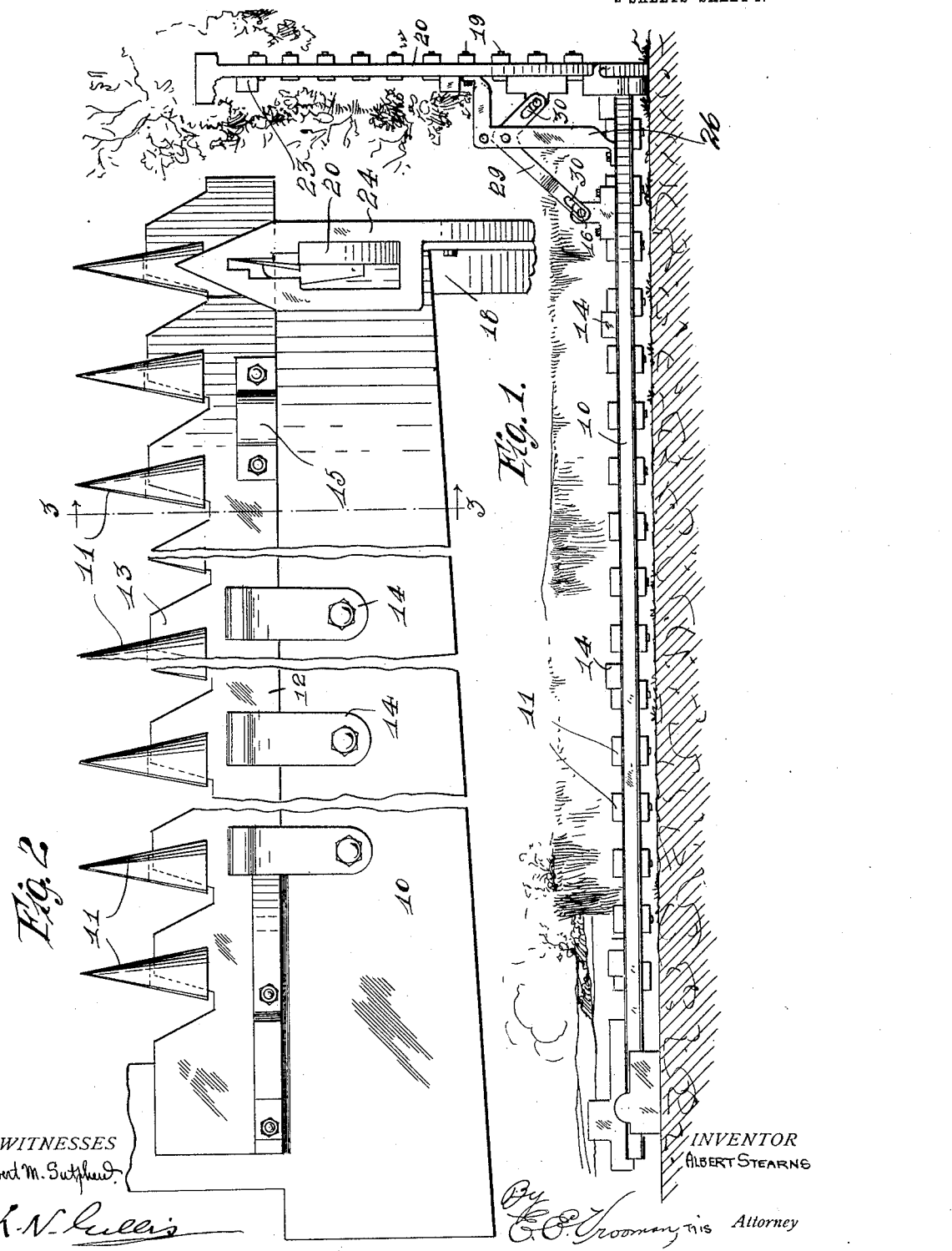
WITNESSES
Robert M. Sutphen
L. N. Gillis
INVENTOR
Albert Stearns
By E. O. Grooman, his Attorney A. STEARNS.
SICKLE APPARATUS.
APPLICATION FILED JUNE 4, 1912.
1,112,231.
Patented Sept. 29, 1914.
2 SHEETS—SHEET 2.
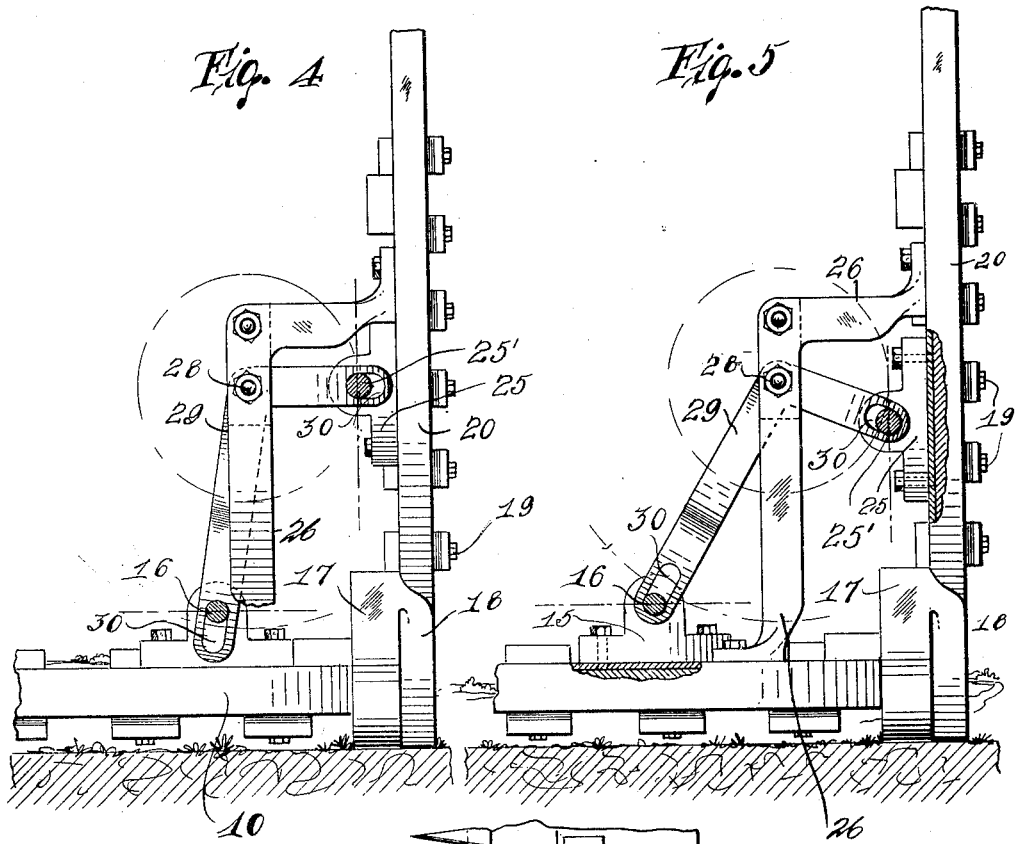
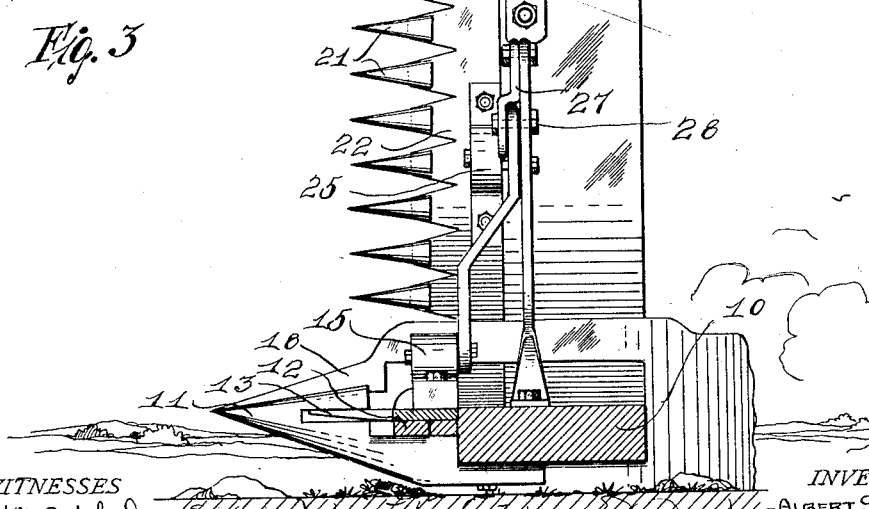
WITNESSES
Robert M. Sutphen
L. N. Gillis
INVENTOR
ALBERT STEARNS
By E. O. Trooman, his Attorney.

UNITED STATES PATENT OFFICE.

ALBERT STEARNS, OF ALTO PASS, ILLINOIS.

SICKLE APPARATUS.

1,112,231.  Specification of Letters Patent.  Patented Sept. 29, 1914.

Application filed June 4, 1912. Serial No. 701,602.

*To all whom it may concern:*

Be it known that I, ALBERT STEARNS, citizen of the United States, residing at Alto Pass, in the county of Union and State of Illinois, have invented certain new and useful Improvements in Sickle Apparatus, of which the following is a specification, reference being had therein to the accompanying drawing.

This invention relates to agricultural machinery and has special reference to a mowing machine.

The principal object of the invention is to improve and simplify the construction of the mowing means usual in such machines.

The second object of the invention is to provide a vertical sickle operated by novel means for the purpose of cutting pea vines or tangled grass.

With the above and other objects in view, the invention consists in general of certain novel constructions and arrangements of details and combinations of parts hereinafter fully described, illustrated in the accompanying drawings, and specifically claimed.

In the accompanying drawings, like characters of reference indicate like parts in the several views, and Figure 1 is a rear elevation of a sickle bar constructed in accordance with this invention. Fig. 2 is an enlarged detailed plan partly broken away, of the main or horizontal sickle. Fig. 3 is a section along the line 3—3 of Fig. 2. Fig. 4 is a detailed elevation showing the operating means for a certain sickle. Fig. 5 is a view similar to Fig. 4 with the operating means shown in a certain position.

In carrying out the objects of this invention, there is provided the usual finger bar 10 having teeth 11 secured thereto, and extending in spaced relation therealong. Slidable along this tooth bar is a knife bar 12 carrying the knives 13. The knife bar 12 is held in place by the clips 14 which are securely bolted in the finger bar 10. Mounted on the knife 13 is a lug 15 provided with a projecting pin 16, the purpose of which will be hereinafter described. At the end of the sickle bar there is provided a divider 17 having the usual pointed tooth 18, and in the side of the divider 17 there is formed a pocket 19 wherein fits the lower end of an auxiliary finger bar 20. On this auxiliary finger bar are provided the teeth 21 and a knife 22 is mounted slidably therein, being held in position by means of the clips 23. This second sickle bar is provided at its upper end with a divider 24. On this knife bar 22 is mounted a lug 25 from which a pin 25' projects. Connecting the two sickle bars is a brace bar 26 having secured thereto a plate 27 extending downwardly, and the free ends of said plate and said brace are provided with registering openings wherethrough passes a pivot pin 28 on which is mounted a bell-crank lever 29 having its ends provided with the slots 30 for the reception of the pins 16 and 26. The arms of this lever are so proportioned as to give a stroke to the vertical knife one-half that given to the horizontal knife.

In the operation of this device, the horizontal knife when reciprocated, moves the bell-crank lever so that the vertical knife may also be reciprocated, thus cutting pea vines or tangled grass through which said knife passes.

There has thus been provided a simple and efficient device of the character described and for the purpose specified.

It is obvious that many minor changes may be made in the form and construction of this invention without departing from the material principles thereof. It is not, therefore, desired to confine the invention to the exact form herein shown and described, but it is wished to include all such as properly come within the scope of the appended claim.

Having thus described the invention, what is claimed as new is:—

A sickle comprising a horizontal finger bar, a divider at one end of said horizontal finger bar, a vertical finger bar having its lower end portion in said pocket in said divider, knives traveling longitudinally upon said finger bars, a bracket secured to said finger bars, said bracket having substantially an inverted L-shape and having its vertical arm extending in spaced relation to the vertical finger bar with its lower end bent to form a foot secured to the horizontal finger bar and having its horizontal arm carried toward the vertical finger bar and terminating in a foot secured to the vertical finger bar whereby said bracket forms a substantially diagonal brace connected with said finger bars at a point in spaced relation to the connected ends of said finger bars to prevent pivotal movement of said finger bars with respect to each other, and a bell crank lever pivotally mounted upon said brace and having its arms connected with said
5 knives whereby longitudinal movement of one knife will transmit longitudinal movement to the other of said knives.

In testimony whereof I hereunto affix my signature in presence of two witnesses.

ALBERT STEARNS.

Witnesses:
A. TUCKER,
T. J. OWEN.

Copies of this patent may be obtained for five cents each, by addressing the "Commissioner of Patents, Washington, D. C."